W. J. NESBITT.
HEEL CUTTING APPARATUS.
APPLICATION FILED DEC. 20, 1918.

1,326,151.

Patented Dec. 23, 1919.
3 SHEETS—SHEET 1.

Witness:
W. M. Gentle.

Inventor.
William J. Nesbitt.
By Westall and Wallace
his attorneys

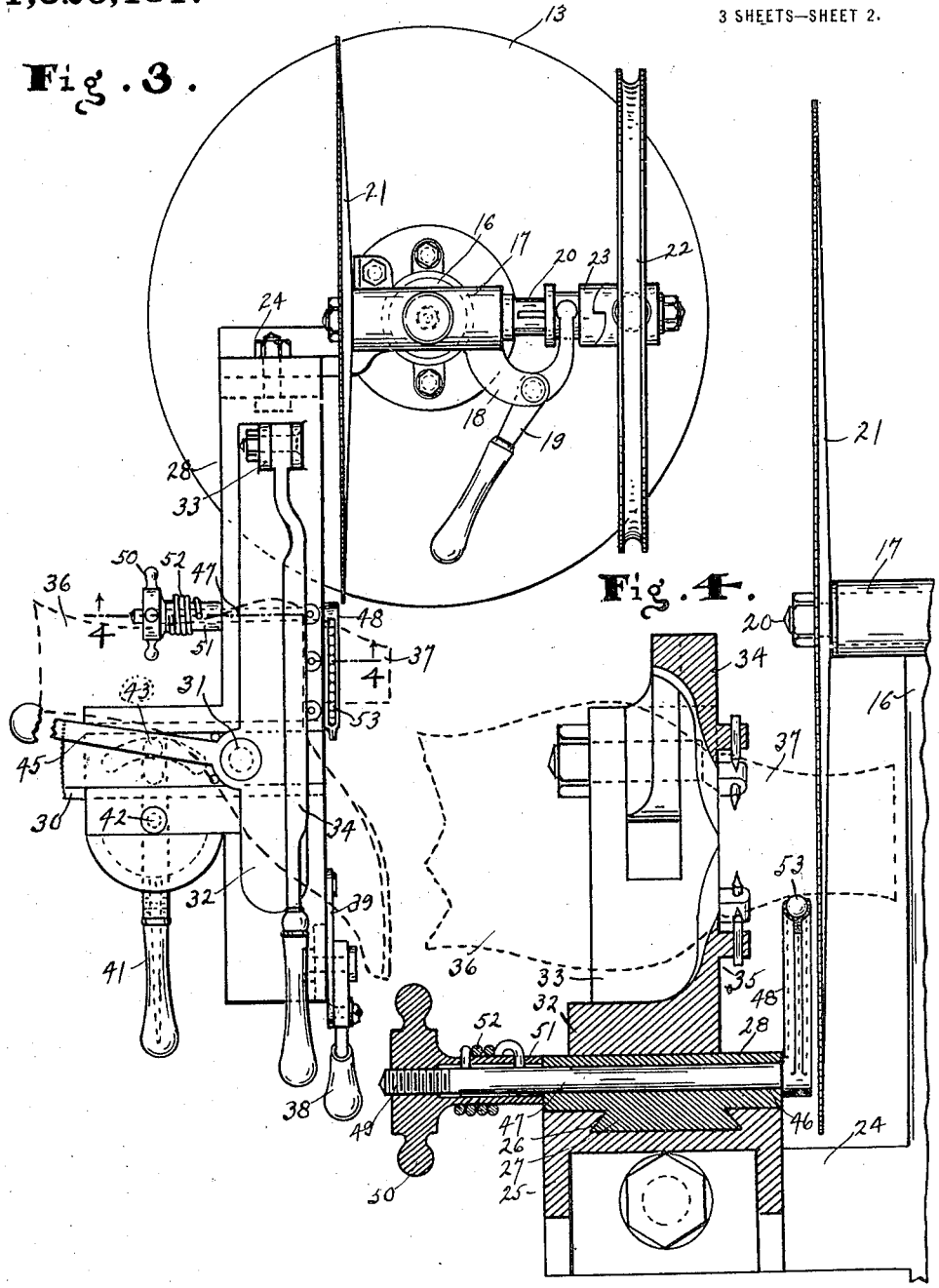

W. J. NESBITT.
HEEL CUTTING APPARATUS.
APPLICATION FILED DEC. 20, 1918.
1,326,151.
Patented Dec. 23, 1919.
3 SHEETS—SHEET 3.
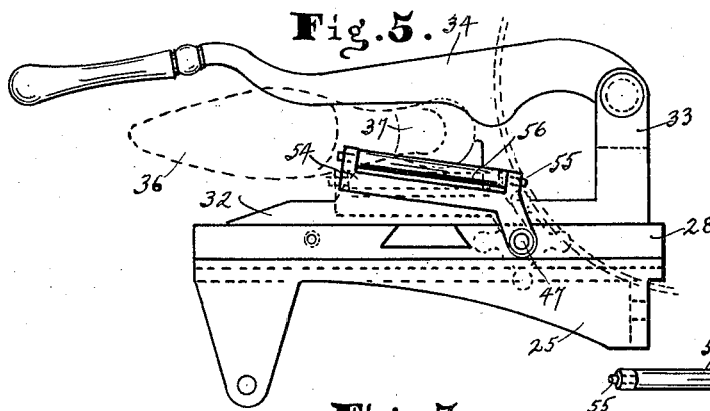
Fig. 5.
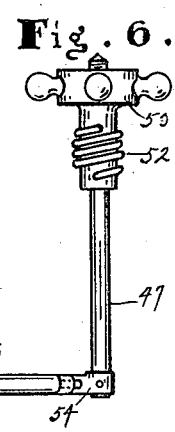
Fig. 6.
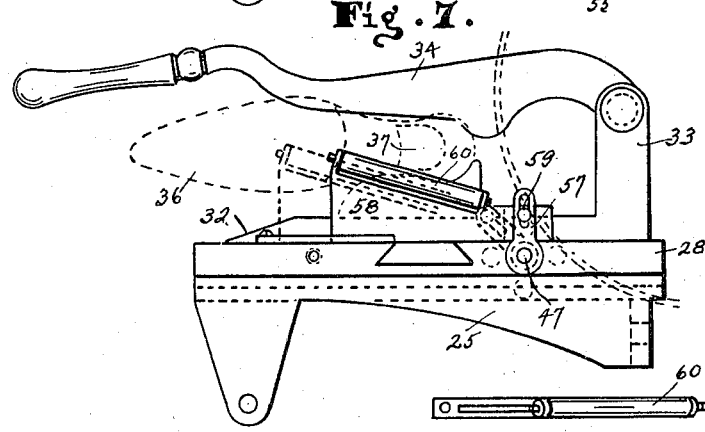
Fig. 7.
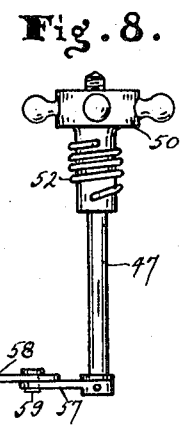
Fig. 8.
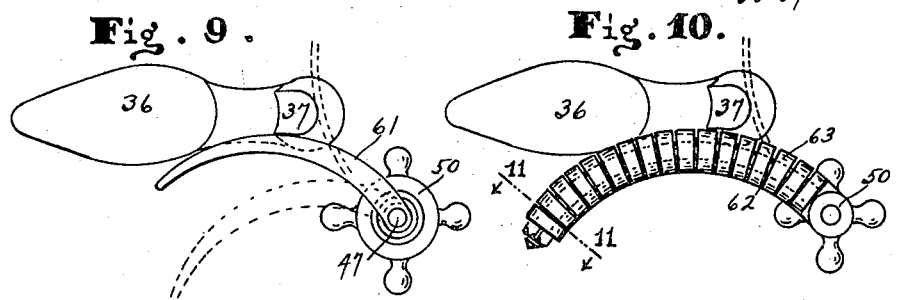
Fig. 9. Fig. 10.
Fig. 11.
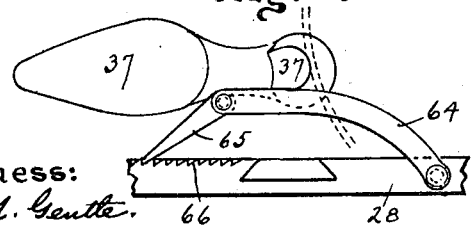
Fig. 12.
Witness:
W. M. Gentle.
Inventor.
William J. Nesbitt.
By Westall and Wallace
his attorneys

UNITED STATES PATENT OFFICE.

WILLIAM J. NESBITT, OF LOS ANGELES, CALIFORNIA.

HEEL-CUTTING APPARATUS.

1,326,151.  Specification of Letters Patent.  Patented Dec. 23, 1919.

Application filed December 20, 1918. Serial No. 267,560.

*To all whom it may concern:*

Be it known that I, WILLIAM J. NESBITT, a citizen of the United States, residing at Los Angeles, in the county of Los Angeles and State of California, have invented new and useful Improvements in Heel-Cutting Apparatus, of which the following is a specification.

This invention relates to heel cutting apparatus, and pertains particularly to a machine for cutting off the worn heels of shoes.

With the type of machine shown herein, that is, the combination of a shoe clamping mechanism, and a circular saw, it has been found difficult to properly hold the heel of the shoe during the cutting operation. The principal object of this invention is to provide a novel and improved construction of heel support, that will resist the downward cutting pressure of the circular saw while severing the heel. Another object of this invention is to provide a support of the character described, which is easily adjusted to heels of various sizes and kinds and will not mar or injure the heel while adjustment is being made.

Figure 1:
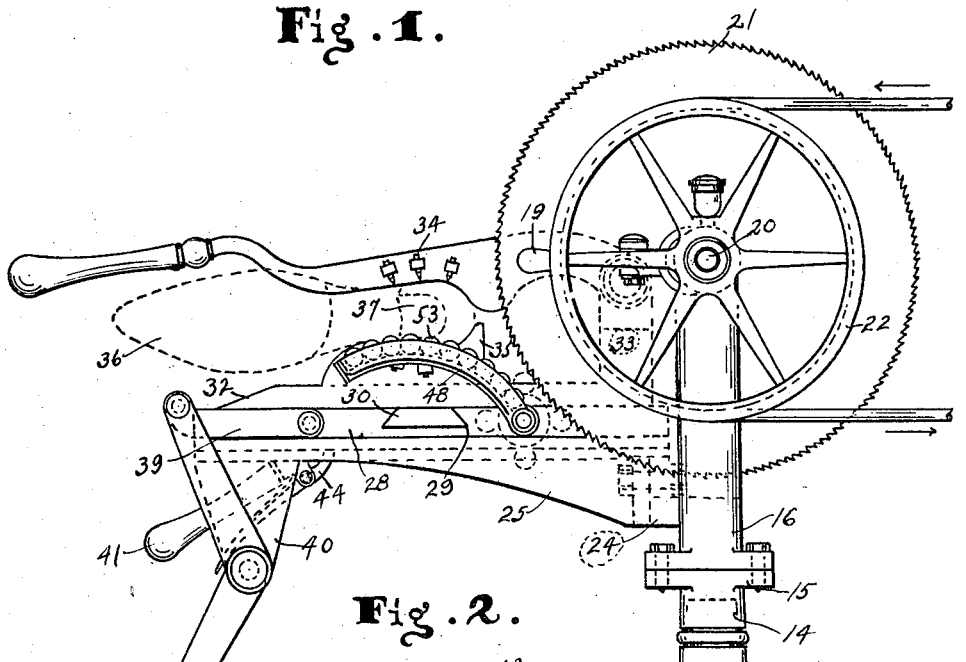
Figure 2:
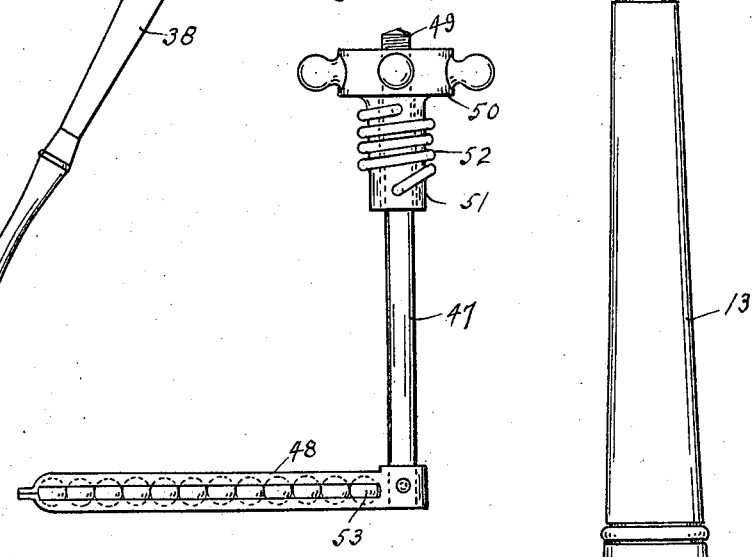

I accomplish these objects by means of the embodiments of my invention illustrated in the accompanying drawings, in which:

Figure 1 is a side view of the heel cutting apparatus having a heel support of preferred form, and with a shoe shown by dotted lines. Fig. 2 is an enlarged plan view of the preferred form of heel support. Fig. 3 is a plan view of the heel cutting apparatus shown in Fig. 1. Fig. 4 is an enlarged section as seen on the line 4—4 of Fig. 3. Fig. 5 is a fragmentary view of the clamping mechanism with a modified form of heel support. Fig. 6 is an enlarged plan view of the support shown in Fig. 5. Fig 7 is a side elevation of the clamping mechanism with another modified form of heel support. Fig. 8 is an enlarged plan view of the heel support shown in Fig. 7. Figs. 9, 10 and 12 are side elevations of further modified forms of heel supports. Fig. 11 is a section as seen on the line 11—11 of Fig. 10.

Referring more particularly to Figs. 1 to 4 inclusive, a pedestal 13 has a shank 14. Mounted on the shank is a head 15. Bolted to head 15 is a standard 16 carrying at the upper end a bearing 17. Extending laterally from the bearing 17 is a bracket 18, to which is pivotally attached a clutch lever 19. Journaled in the bearing 17 is a shaft 20 having a circular saw 21 secured to one end thereof and a driving pulley 22 secured to the other end thereof. Splined to the shaft 20 is a clutch jaw 23 coöperating with a clutch jaw on pulley 22 and operated by means of the clutch lever 19.

Standard 16 has a bracket 24 to which is bolted a stationary table 25. Table 25 is provided with a dove-tailed groove 26, and into the groove is slidably fitted the tongue 27 of a movable table 28. The table 28 has on its upper surface a dove-tailed groove 29 that is at right-angles to the groove 26; and in this groove 29 there is slidably mounted the plate 30.

The plate 30 is provided with a pivot pin 31, see Fig. 3, upon which is mounted a shoe holding plate 32. On the rear of plate 32, there is a bifurcated post 33, in which one end of a lever 34 is pivotally mounted. Lever 34 is so formed that it constitutes a jaw, which coöperates with an under jaw 35 formed on the plate 32. These jaws are adapted to fit in the crease between the upper of the heel and the rand, and hold the shoe securely while a portion of the heel is being cut away by the saw. The jaws are provided with teeth for gripping the rand.

The shoe 36 is clamped between the jaws 34 and 35, and moved toward the saw 21 for cutting off a portion of the heel 37. This movement is secured by means of a lever 38 connected by a link 39 to the table 28, the lever being pivotally mounted upon a bracket 40 depending from the table 25. From the foregoing it can readily be seen that by moving the handle of lever 38 the table 28 and consequently the shoe holding means will be moved together with the shoe toward the saw 21.

The shoe holding means is movable at right angles to the plane of the saw in order to cut away a larger or smaller portion of the heel. This transverse movement is accomplished by means of the lever 41 and its associated parts. This lever 41 is pivoted at 42 to the underside of an extension of the movable table 28. At the end of lever 41 is a pin 43, which rides in an arcuate slot in the extension of table 28. Pin 43 also extends into a transverse slot on the plate 30. The lever 41 is provided with a dog 44 which engages the underside of plate 28 and by friction holds plate 30 in a fixed position. The plate 32 can be turned on the pivot 31 so as to change the angle of the shoe holding means and consequently the shoe to the plane of the saw, and thereby enable the operator to cut off a portion of the shoe heel at any desirable angle. Integral with the plate 32 is a lever extension 45, and this lever may be provided with suitable locking means to hold the lever in adjusted position.

Extending transversely through plate 28 is a bore 46 in which is pivotally mounted the shaft 47 of a heel support. Fixed to one end of the shaft 47 is an arm 48. The opposite end of shaft 47 is threaded as indicated at 49, and mounted on the threaded end is a nut 50. Nut 50 has a tubular extension 51 provided with a bore of larger diameter than the shaft 47. Mounted upon the extension is a spiral spring 52 having its ends passing through openings in the wall of the extension and bearing upon the shaft 47. There is a frictional engagement between the spring and the shaft, and a consequent frictional connection between the nut 50 and shaft. In order to provide for convenient manipulation of the nut, the latter is provided with knobs upon its periphery. Referring to the heel supporting arm 48, as shown in Figs. 1, 2, 3 and 4, it will be noted that it is in the form of a cage having a number of steel balls 53 mounted therein. In this manner a ball bearing is formed for the heel. The direction of the thread on the shaft 47 is such that by turning the nut 50, the shaft 47 will be moved by reason of its frictional connection with the shaft so as to bring the convex side of the arm 48 against the heel, after which the nut will turn on the shaft. Suppose the shoe 36 is in position on the clamping device, nut 50 is then rotated so as to bring arm 48 in contact with the heel 37. After coming in contact with the heel, the shaft is prevented from further rotating, and nut 50 is turned on the shaft. The tubular extension 51 of the nut tightens against the side of table 28 and clamps the supporting arm 48 in position against the heel.

The operation of the clamping device so as to make a proper cut of the heel needs no explanation, and does not form a part of this invention. It will be noted, however, that the heel supporting arm is disposed between the jaws of the clamping device and the saw so that the heel is cut on the outer side of the heel supporting arm. If the supporting arm is placed in a position so that the saw is disposed between the clamping jaws and the heel supporting arm, there will be a sag of the heel as the downward pressure of the saw is placed thereon. This results in closing the kerf formed by the saw so that the heel pinches the saw and causes either damage to the heel or injury to the saw. With the construction shown in the drawing, there is no support on the outer end of the heel and no difficulty is experienced with the saw being pinched by the heel.

Referring to the form of my invention shown in Figs. 5 and 6, instead of a ball bearing arm 48, shaft 47 has secured thereto an arm 54 carrying shaft 55. Journaled upon shaft 55 is a roller 56, which engages the shoe. In this manner an anti-friction support is provided for the heel.

Referring particularly to Figs. 7 and 8, shaft 47 has a slotted arm 57 fixed thereto. Mounted upon the table 28 is a slide 58 having a pin 59 disposed in the slot in arm 57. Journaled on the upper face of the slide 58 is a roller 60 which engages the heel of the shoe. The operation of moving the heel support into engagement with the heel is apparent from the drawing.

Referring particularly to Fig. 9, an arcuate arm 61 similar to arm 48, shown in Figs. 1, 2, 3 and 4, is attached to shaft 47. In this form there is no anti-friction means on the arm.

In Figs. 10 and 11, I have shown an arm 62, upon which is journaled a plurality of rollers 63.

Referring to Fig. 12 the table 28 has pivotally secured thereto an arm 64. Pivotally secured to the end of arm 64 is a dog 65 which engages teeth 66 formed upon the surface of table 28. It is obvious that by moving arm 64 into engagement with the heel, the dog 65 will have dropped into a tooth on the table, and support the end of arm 64 so that it remains in engagement with the heel.

What I claim is:

1. In a heel cutting apparatus, the combination of a shoe clamping device, a saw, a heel support independent of said clamping device spaced from and interposed between said saw and said device, said support being movable into engagement with the heel of a shoe held in said clamping device so as to support said shoe from below, and means to lock said support against said heel.

2. In a heel cutting apparatus, the combination of a table, a shoe clamping device mounted thereon, a saw, a rotatable shaft mounted on said table, and a heel support secured to said shaft and movable thereby into and out of engagement with the heel of a shoe held in said clamping device.

3. In a heel cutting apparatus, the combination of a table, a shoe clamping device mounted thereon, a saw, a rotatable shaft mounted on said table, and a heel support secured to said shaft and movable thereby into and out of engagement with the heel of a shoe held in said clamping device, said support being interposed between said saw and said device.

4. In a heel cutting apparatus, the combination of a table, a shoe clamping device mounted thereon, a saw, a rotatable shaft mounted on said table, a heel support secured to said shaft and movable thereby into and out of engagement with the heel of a shoe held in said clamping device, and means to lock said shaft against rotation.

5. In a heel cutting apparatus, the combination of a table, a shoe clamping device mounted thereon, a saw, a rotatable shaft mounted on said table, a heel support secured to said shaft and movable thereby into and out of engagement with the heel of a shoe held in said clamping device, said heel support being interposed between said saw and said device, and means to lock said shaft against rotation.

6. In a heel cutting apparatus, the combination of a table, a shoe clamping device mounted thereon, a saw, a rotatable shaft mounted on said table, a heel support movable by said shaft, and a tightening nut threaded on said shaft, said nut being frictionally fitted to said shaft so as to first turn said shaft and then slip thereon.

7. In a heel cutting apparatus, the combination of a table, a shoe clamping device mounted thereon, a saw, a rotatable shaft mounted on said table, a heel support movable by said shaft, a tightening nut on said shaft, and frictional engaging means securing said nut to said shaft.

8. In a heel cutting apparatus, the combination of a table, a shoe clamping device mounted thereon, a saw, a rotatable shaft mounted on said table, a heel support movable by said shaft, a tightening nut threaded on said shaft, and a spring frictional connection between said shaft and said nut.

9. In a heel cutting apparatus, the combination of a table, a shoe clamping device mounted thereon, a saw, a rotatable shaft mounted on said table, a heel support movable by said shaft, a tightening nut threaded on said shaft and having its bore enlarged, and a spring mounted on said nut frictionally connecting said nut and said shaft.

10. In a heel cutting apparatus, the combination of a shoe clamping device, a saw, and a heel support interposed between said saw and said device, said support having anti-friction means for engagement with the heel of a shoe held in said clamping device.

11. In a heel cutting apparatus, the combination of a shoe clamping device, a saw, and a heel support interposed between said saw and said device, said support having anti-friction rolling devices for engagement with the heel of a shoe held in said clamping device.

12. In a heel cutting apparatus, the combination of a shoe clamping device, a saw, and a heel support interposed between said saw and said device, said support comprising a cage having balls therein to provide anti-friction contact between the heel of a shoe held in said clamping device and said support.

13. In a heel cutting apparatus, the combination of a shoe clamping device, a saw, a heel support movable into engagement with the heel of a shoe held in said clamping device, said support having anti-friction means for engagement with the heel, and means to lock said support against said heel.

14. In a heel cutting apparatus, the combination of a table, a shoe clamping device mounted thereon, a saw, a rotatable shaft mounted on said table, a heel support movable by said shaft, said support having anti-friction means for engagement with the heel of a shoe held in said clamping device, and a tightening nut threaded on said shaft, said nut being frictionally fitted to said shaft so as to first turn said shaft and then slip thereon.

In witness that I claim the foregoing I have hereunto subscribed my name this 14th day of December, 1918.

WILLIAM J. NESBITT.